United States Patent
Zhang et al.

(10) Patent No.: US 11,870,535 B2
(45) Date of Patent: Jan. 9, 2024

(54) MULTI QUASI CO-LOCATION RELATIONSHIP FOR A SINGLE PORT FOR RADIO LINK MONITORING OR BEAM FAILURE DETECTION REFERENCE SIGNAL

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/488,207

(22) Filed: Sep. 28, 2021

(65) Prior Publication Data

US 2022/0103236 A1   Mar. 31, 2022

Related U.S. Application Data

(60) Provisional application No. 63/085,907, filed on Sep. 30, 2020.

(51) Int. Cl.
   *H04B 7/08* (2006.01)
   *H04W 16/28* (2009.01)
   (Continued)

(52) U.S. Cl.
   CPC .......... *H04B 7/088* (2013.01); *H04B 7/0626* (2013.01); *H04B 17/336* (2015.01);
   (Continued)

(58) Field of Classification Search
   CPC .... H04B 7/088; H04B 17/336; H04B 7/0626; H04L 5/0051; H04W 16/28
   See application file for complete search history.

(56) References Cited

U.S. PATENT DOCUMENTS

| 2021/0028852 A1* | 1/2021 | Hwang | H04B 17/327 |
| 2022/0294514 A1* | 9/2022 | Kang | H04L 5/005 |
| 2022/0303090 A1* | 9/2022 | Zhang | H04L 5/0048 |

OTHER PUBLICATIONS

Nokia., et al., "Enhancements for HST-SFN Deployment", 3GPP TSG RAN WG1 #102-e Meeting, 3GPP Draft, R1-2006847, 3rd Generation Partnership Project (3GPP), Mobile Competence Centre, 650, Route Des Lucioles, F-06921 Sophia-Antipolis Cedex, France, RAN WG1, No. E-meeting, Aug. 17, 2020-Aug. 28, 2020, Aug. 7, 2020, (Aug. 7, 2020), (Aug. 7, 2020), 8 Pages, XP051915492, Retrieved from the Internet: https://www.3gpp.org/ftp/TSG_RAN/WG1_RL1/TSGR1_102-e/Docs/R1-2006847.zip, [retrieved on Aug. 7, 2020], Section 2, p. 1 p. 4.

(Continued)

*Primary Examiner* — Derrick V Rose

(74) *Attorney, Agent, or Firm* — Procopio, Cory, Hargreaves & Savitch LLP

(57) ABSTRACT

A UE receives, from a base station, a configuration for multiple quasi co-location (QCL) type D relationships for a single port reference signal (RS) for radio link management (RLM) or beam failure detection (BFD). The UE transmits or receives single frequency network (SFN) communication from the base station based on the multiple QCL type D relationships for the single port RLM or BFD RS and performs radio link or BFD measurements for the SFN communication based on the configuration for the multiple QCL type D relationships for the single port RS for RLM or BFD.

33 Claims, 10 Drawing Sheets

(51) Int. Cl.
*H04W 24/10* (2009.01)
*H04B 17/336* (2015.01)
*H04L 5/00* (2006.01)
*H04B 7/06* (2006.01)

(52) U.S. Cl.
CPC .......... *H04L 5/0051* (2013.01); *H04W 16/28* (2013.01); *H04W 24/10* (2013.01)

(56) References Cited

OTHER PUBLICATIONS

Partial International Search Report—PCT/US2021/052697—ISA/EPO—dated Feb. 2, 2022.
Sony: "Considerations on HST-SFN Operation for Multi-TRP", 3GPP TSG RAN WG1#102e, 3GPP Draft, R1-2005564, 3rd Generation Partnership Project (3GPP), Mobile Competence Centre, 650, Route Des Lucioles, F-06921 Sophia-Antipolis Cedex, France, RAN WG1, No. E-meeting, Aug. 17, 2020-Aug. 28, 2020, Aug. 7, 2020, (Aug. 7, 2020), 3 Pages, XP051917544, Retrieved from the Internet: https://www.3gpp.org/ftp/TSG_RAN/WG1_RL1/TSGR1_102-e/Docs/R1-2005564.zip, [retrieved on Aug. 7, 2020], Sections 2 and 2.1, p. 1-p. 2.
International Search Report and Written Opinion—PCT/US2021/052697—ISA/EPO—dated Mar. 23, 2022.

* cited by examiner

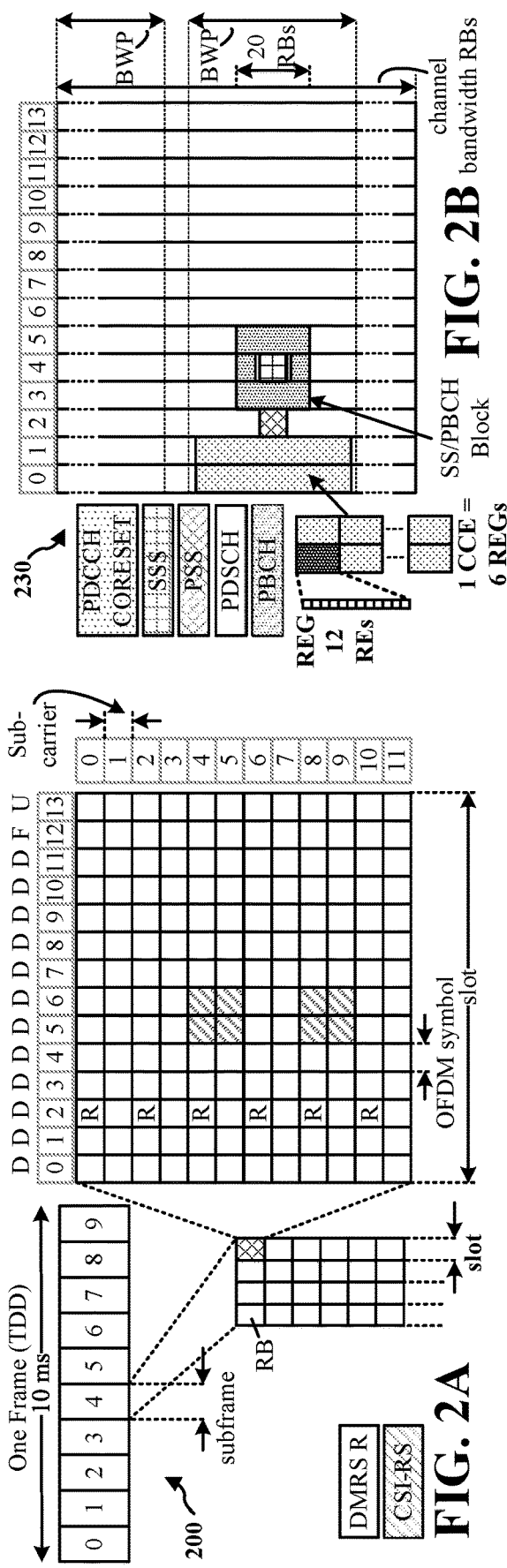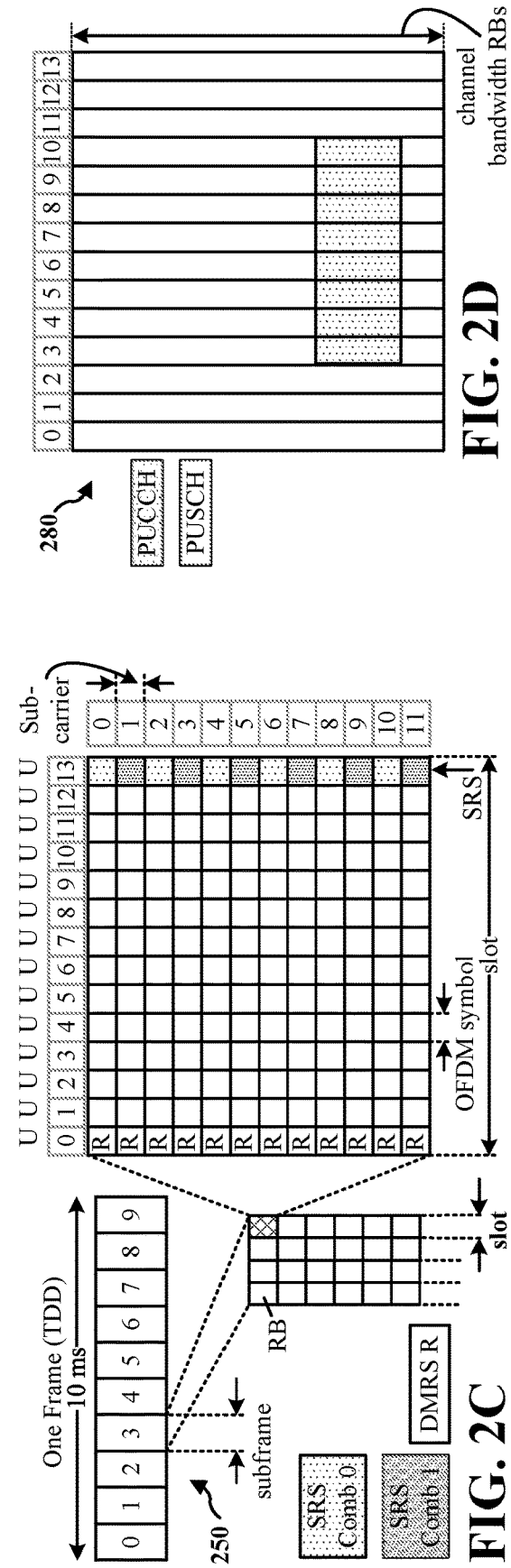

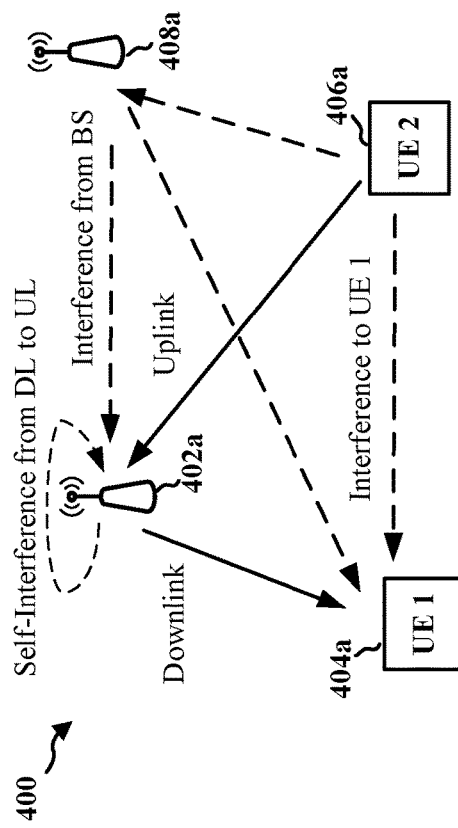
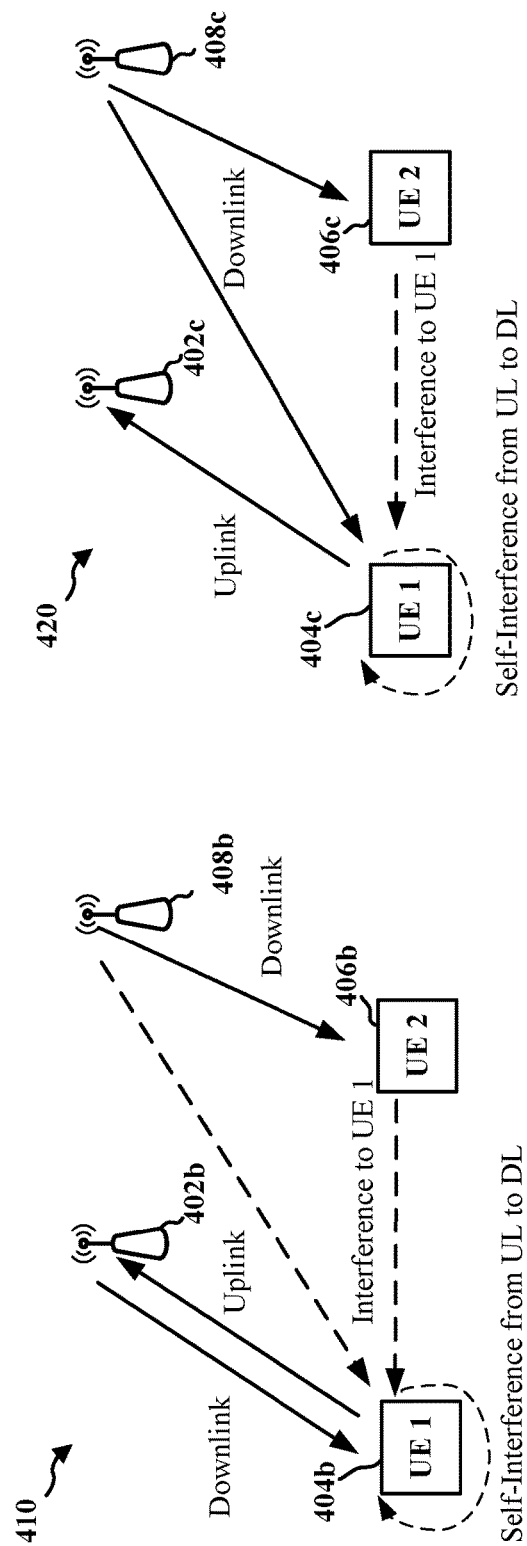
FIG. 4A
FIG. 4B
FIG. 4C

MULTI QUASI CO-LOCATION RELATIONSHIP FOR A SINGLE PORT FOR RADIO LINK MONITORING OR BEAM FAILURE DETECTION REFERENCE SIGNAL

CROSS REFERENCE TO RELATED APPLICATION(S)

This application claims the benefit of and priority to U.S. Provisional Application Ser. No. 63/085,907, entitled "Multi Quasi Co-Location Relationship For a Single Port for Radio Link Monitoring or Beam Failure Detection Reference Signals" and filed on Sep. 30, 2020, which is expressly incorporated by reference herein in its entirety.

TECHNICAL FIELD

The present disclosure relates generally to communication systems, and more particularly, to wireless communication based on directional beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives, from a base station, a configuration for multiple quasi co-location (QCL) type D relationships for a single port reference signal (RS) for radio link management (RLM) or beam failure detection (BFD). The apparatus transmits or receives single frequency network (SFN) communication from the base station based on the multiple QCL type D relationships for the single port RLM or BFD RS and performs radio link or BFD measurements for the SFN communication based on the configuration for the multiple QCL type D relationships for the single port RS for the RLM or the BFD.

In another aspect of the disclosure, a method, a computer-readable medium, and an apparatus are provided for wireless communication at a base station. The apparatus transmits, to a UE, a configuration for multiple QCL type D relationships for a single port RS for RLM or BFD. The apparatus transmits or receives SFN communication with the UE based on the multiple QCL type D relationships for the single port RS for the RLM or the BFD.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A, 4B, and 4C illustrate example diagrams of full-duplex wireless communication.

DETAILED DESCRIPTION

Figure 1:
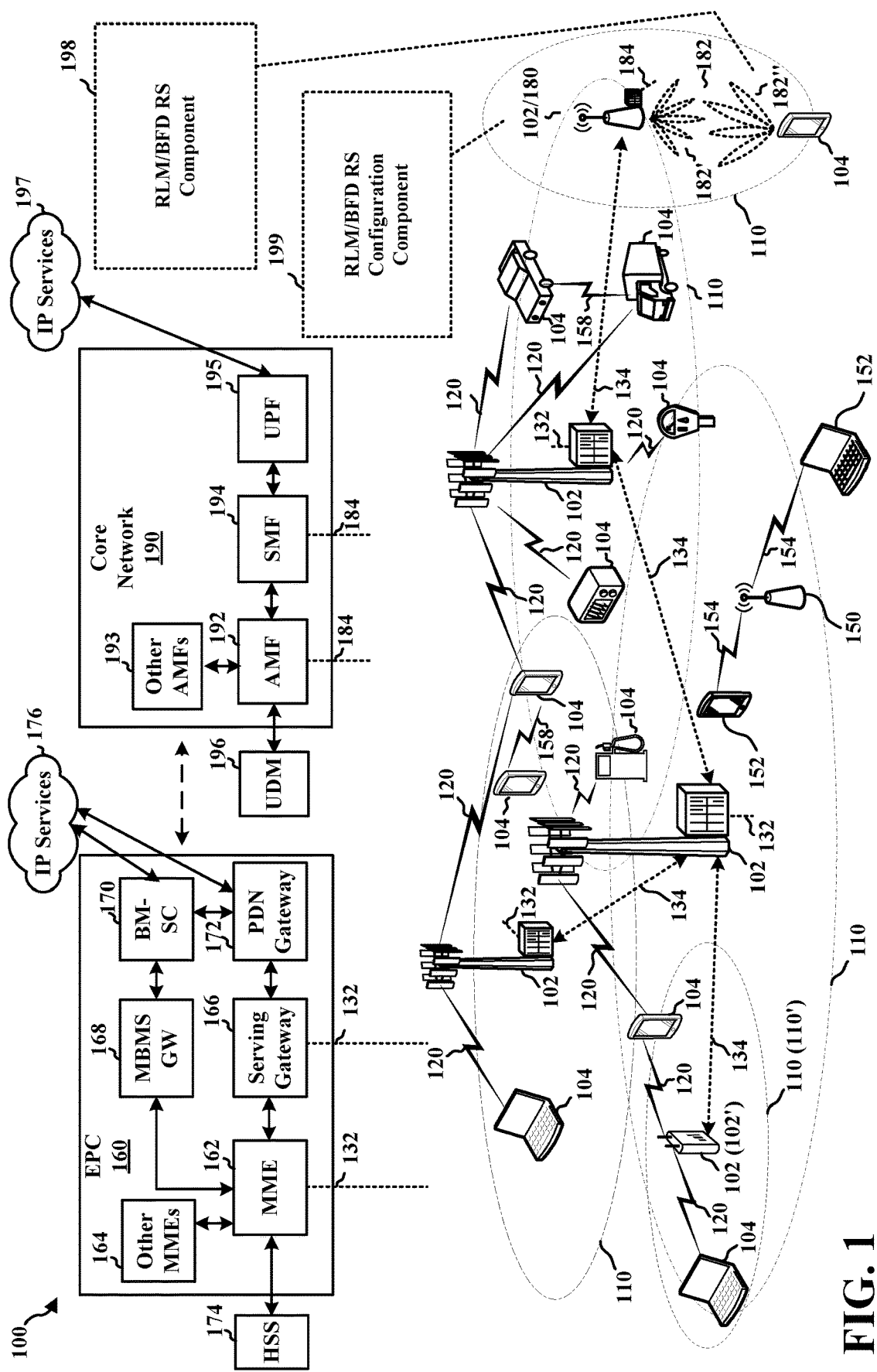
FIG. 1 is a diagram illustrating an example of a wireless communications system and an access network.

A UE and/or a base station may communicate in a full-duplex mode in which uplink communication and downlink communication is exchanged in a same frequency band at overlapping times. The UE and the base station may exchange communication using one or more directional beams. A beam between the UE and the base station may become blocked, which may lead to downlink and/or uplink beam degradation leading to a beam failure. As an example, in a full-duplex mode, the UE or the base station may experience self-interference for a beam that leads to a beam failure for downlink communication. The base station and the UE may perform beam training to determine the best receive and transmit directions for continued communication. The transmit and receive directions for the base station may or may not be the same. The transmit and receive directions for the UE may or may not be the same.

Aspects presented herein enable improved reliability for single frequency network (SFN) transmissions by providing multiple TCI states/spatial relations (e.g., QCL type D RS) for a single port RS for radio link monitoring (RLM) or beam failure detection (BFD). The aspects presented herein support single layer transmission and/or reception with multiple beams, such as with two beams. The base station may provide the UE with a configuration for multiple QCL type D relationships (e.g., two) for a single port RS for RLM or BFD. As an example, for a half-duplex mode, the base station may configure a non-zero channel state information reference signal (NZP-CSI-RS) resource configuration in an RLM RS or BFD RS configuration to include multiple TCI states (e.g., two TCI states) The UE may then perform RLM or BFD measurements for the SFN communication based on the configuration for the multiple QCL type D relationships for the single port RS for RLM or BFD.

The configuration of multiple QCL Type D relationships for a single port RS for RLM or BFD provides for improved of RLM or BFD measurements by supporting single layer transmission and/or reception with multiple beams.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) illustrates base stations 102 or 180, UEs 104, an Evolved Packet Core (EPC) 160, and another core network 190 (e.g., a 5G Core (5GC)). A UE 104 and/or a base station 102 or 180 may communicate in a full-duplex mode in which uplink communication and downlink communication is exchanged in a same frequency band at overlapping times. The UE and the base station may exchange communication using one or more directional beams.

For example, beamforming 182 may be used between a base station 180 and a UE 104 to compensate for the path loss and short range in millimeter wave (mmW) communication. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions.

A beam between the UE 104 and the base station 180 may become blocked, which may lead to downlink and/or uplink beam degradation leading to a beam failure. A UE 104 or a base station 102 or 180 operating in a full-duplex mode may experience self-interference for a beam that leads to a beam failure for downlink communication. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

Aspects presented herein enable improved reliability for single frequency network (SFN) transmissions by providing multiple TCI states/spatial relations (e.g., QCL type D RS) for a single port RS for radio link monitoring (RLM or beam failure detection (BFD). The aspects presented herein support single layer transmission and/or reception with multiple beams, such as with two beams.

For example, a UE 104 may include an RLM/BFD RS component 198 configured to receive, from a base station 102 or 180, a configuration for multiple QCL type D relationships (e.g., two) for a single port RS for RLM or BFD. The RLM/BFD RS component 198 may be further configured to perform radio link or beam failure detection measurements for the SFN communication based on the configuration for the multiple QCL type D relationships for the single port RS for RLM or BFD.

A base station 102 or 180 may include an RLM/BFD RS configuration component 199 configured to transmit, to a UE 104, a configuration for multiple QCL type D relationships for a single port RS for RLM or BFD and to transmit/receive SFN communication with the UE based on the multiple QCL type D relationships for the single port RLM or BFD RS.

Although the following description may be focused on 5G NR, the concepts described herein may be applicable to other similar areas, such as LTE, LTE-A, CDMA, GSM, and other wireless technologies.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations 180, such as a gNB may operate in a traditional sub 6 GHz spectrum, in millimeter wave frequencies, and/or near millimeter wave frequencies in communication with the UE 104. When the gNB (e.g., the base station 180) operates in millimeter wave or near millimeter wave frequencies, the gNB may be referred to as a millimeter wave base station. The millimeter wave base station (e.g., the base station 180) may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
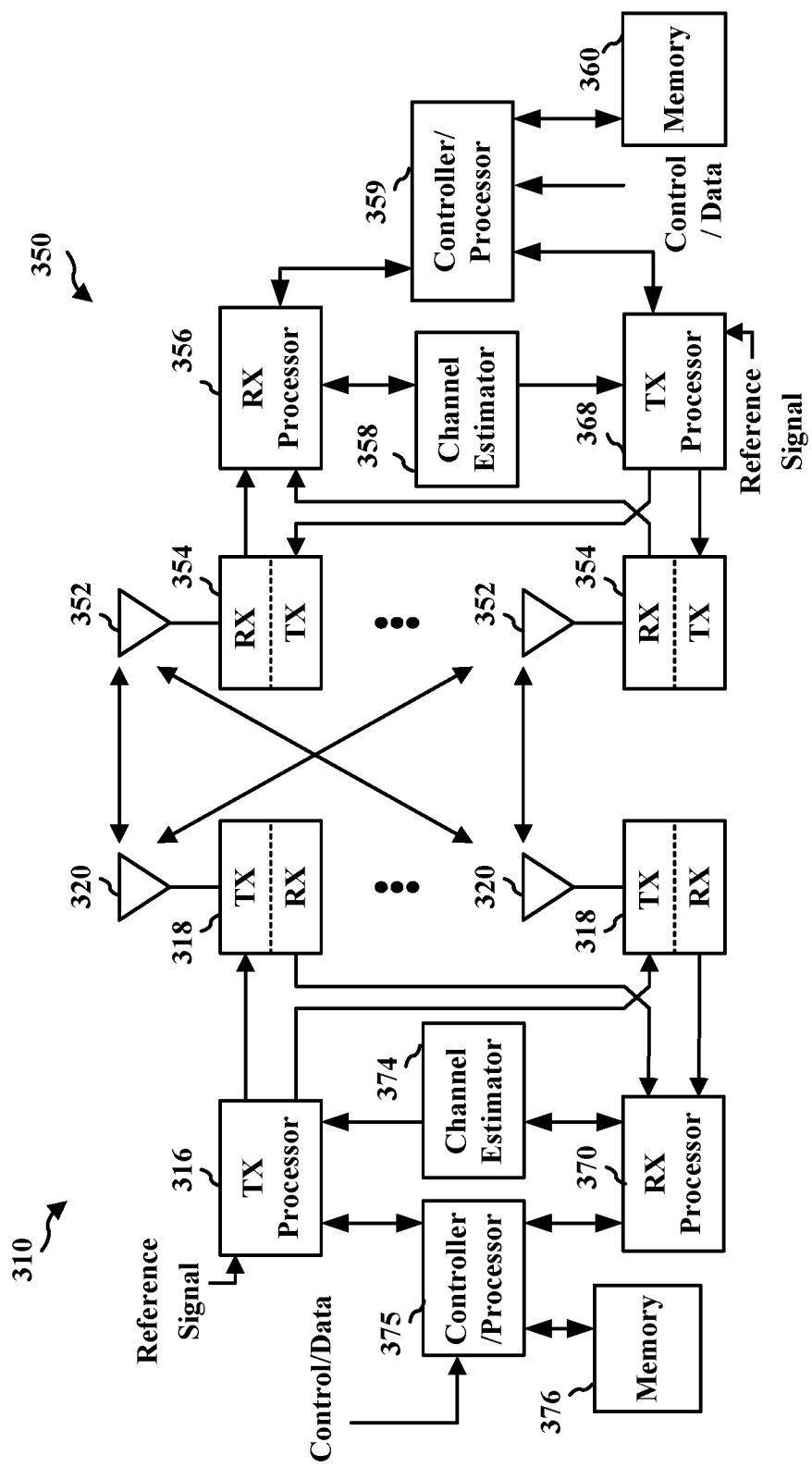
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the RLM/BFD RS component 198 of FIG. 1.

At least one of the TX processor 316, the RX processor 370, and the controller/processor 375 may be configured to perform aspects in connection with the RLM/BFD RS configuration component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full-duplex operation in which a wireless device exchanges uplink and downlink communication that overlaps in time may enable more efficient use of the wireless spectrum. Full-duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full-duplex capability may be supported at a base station and/or a UE. For example, a UE may transmit uplink communication from one antenna panel and may receive downlink communication with another antenna panel. In some examples, the full-duplex communication may be conditional on beam separation or other conditions.

Full-duplex communication may reduce latency. For example, full-duplex operation may enable a UE to receive a downlink signal in an uplink only slot, which can reduce the latency for the downlink communication. Full-duplex communication may improve spectrum efficiency, e.g., spectrum efficiency per cell or per UE. Full-duplex communication may enable more efficient use of wireless resources.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full-duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in a same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE 406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 5:
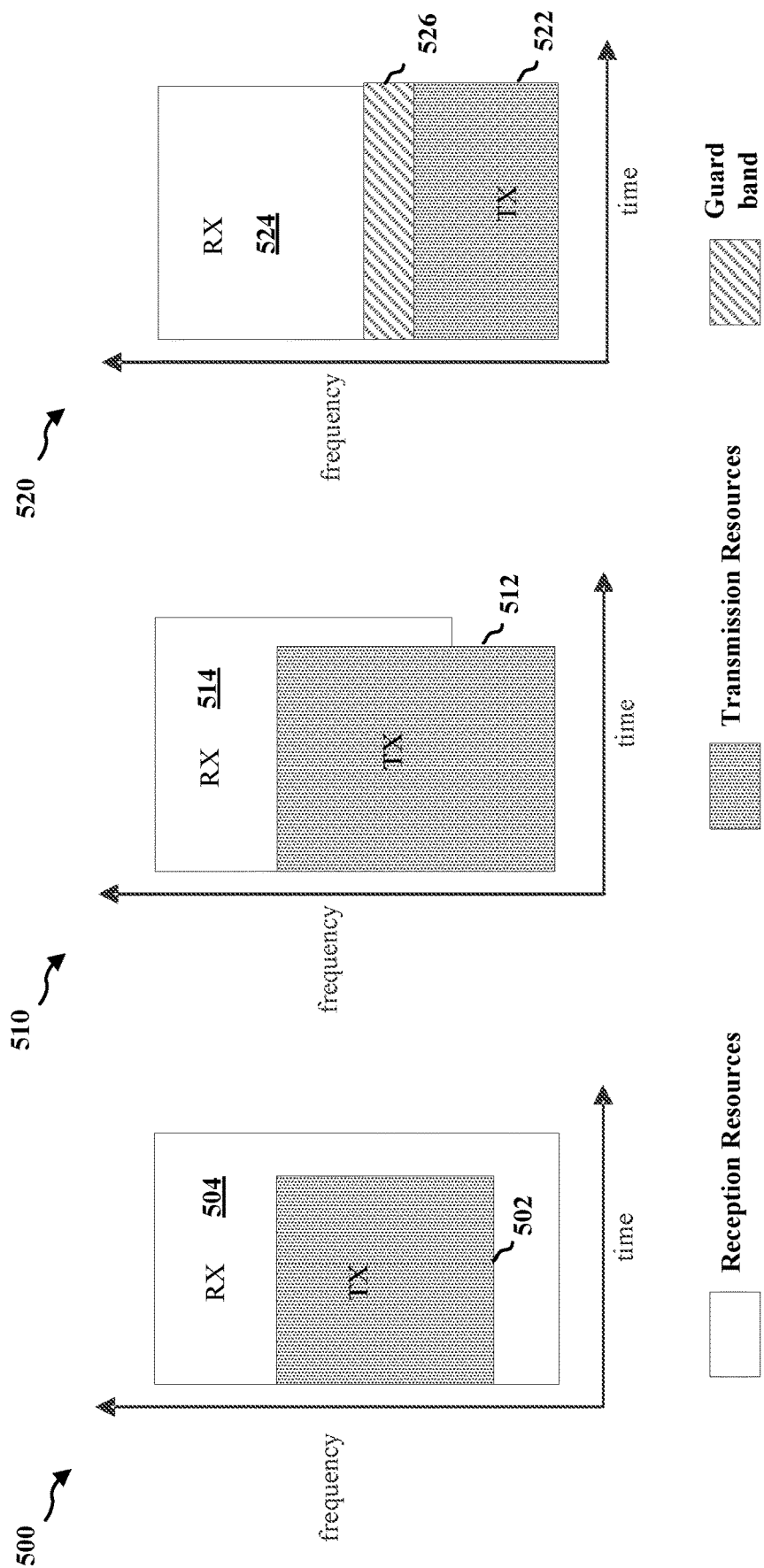
FIG. 5 illustrates examples of in-band full-duplex (IBFD) resources and sub-band frequency division duplex (FDD) resources for full-duplex communication.

Full-duplex communication may be in a same frequency band. The uplink and downlink communication may be in different frequency subbands, in the same frequency subband, or in partially overlapping frequency subbands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

As described in connection with FIG. 1, a UE 104 and a base station 102 or 180 may use beamforming 182 to exchange downlink and uplink communication using directional beams. After determination of a beam for communication, conditions may change and may cause a beam to fail. For example, a UE may experience a beam failure if a user moves to a location that blocks the beam to the base station. For example, the UE may move to a different orientation or may move around a corner, or may move to a location in which a building or other structure blocks the beam. In other examples, the surrounding environment may change, e.g., a vehicle may move to a position that blocks the beam between the UE and the base station. If the current beam used by the UE becomes unreliable, the UE may switch to a new beam. The UE may monitor the quality of the beam and may perform radio link monitoring (RLM) in order to detect a reduction in the beam quality.

For example, a UE may monitor a quality of a signal received via reception beam(s). Measurements for RLM, e.g., of downlink signals, may be performed by a physical (PHY) layer of the UE based on one or more RLM reference signals. The PHY layer may pass the RLM measurements to a medium access control (MAC) layer and radio resource control (RRC) layer. The RRC layer may be responsible for detecting a radio link failure (RLF), and the MAC layer may be responsible for detecting beam failures.

The UE may use a Beam Failure Detection (BFD) procedure to identify problems in beam quality and may use a beam failure recovery (BFR) procedure when a beam failure is detected. For monitoring active link performances, a UE may perform measurements of at least one signal, e.g., reference signals, for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal, or other reference signals for time and/or frequency tracking, etc. In some cases, the UE may determine a configured metric such as block error rate (BLER) for a reference signal. The measurement(s) may indicate the UE's ability to transmit an uplink transmission to the base station using the beam.

Thresholds may be defined in tracking the radio link conditions, the threshold(s) may correspond to an RSRP, an SINR, a BLER, etc. that indicates an in-sync condition and/or an out-of-sync condition of the radio link. For example, a threshold, which may be referred to as Qout_LR, may be used by the PHY layer to trigger a failure indication to the MAC layer. For example, a beam failure instance may be determined if the monitored RLM reference signal(s) fall below the Qout_LR threshold, e.g., if all of the monitored RLM reference signals fall below Qout_LR. The MAC layer may use the indications of the beam failure instances in combination with a count threshold and/or timer to determine a beam failure. For example, the MAC layer may detect compare a number of beam failure instances to a beam failure instance maximum count threshold within a time based on a beam failure detection timer to determine that a beam failure has occurred.

An "out-of-sync" condition may indicate that the radio link condition is poor, and an "in-sync" condition may indicate that the radio link condition is acceptable, and the base station is likely to receive a transmission transmitted on the radio link. An Out-of-Sync condition may be declared when a block error rate for the radio link falls below a threshold over a specified time interval. An in-sync condition may be declared when a block error rate for the radio link is better than a threshold over a specified time interval. If the UE receives a threshold number of consecutive out-of-sync measurements over a period of time, the UE may declare a beam failure.

When a beam failure is detected, a UE may take appropriate actions to recover the connection. For example, after multiple out-of-sync measurements, the UE may transmit a beam failure recovery signal, e.g., a beam failure recovery request (BFRQ) to initiate recovery of the connection with the base station. For example, the UE may receive an RRC configuration from the base station with parameters for a beam failure recovery procedure that the UE may use to indicate to the base station that the beam failure has been detected. The base station and the UE may communicate over active data/control beams both for DL communication and UL communication. The base station and/or UE may switch to a new beam direction using beam failure recovery procedures.

A single frequency network (SFN) may include multiple transmissions of the same signal over the same frequency channel, e.g., by multiple transmitters that transmit the same signal over the same frequency channel. In order to improve the reliability of SFN based communication, a base station may configure multiple TCI states for a single demodulation reference signal (DMRS) port. Each TCI state may correspond to a QCL type D reference signal. The configuration may support single layer transmission and/or reception with two beams. For example, one control resource set (CORE-SET) identifier (ID) may correspond to TCI states for simultaneously transmitting the same control information/data to the UE via one DMRS port to improve reliability.

Figure 6:
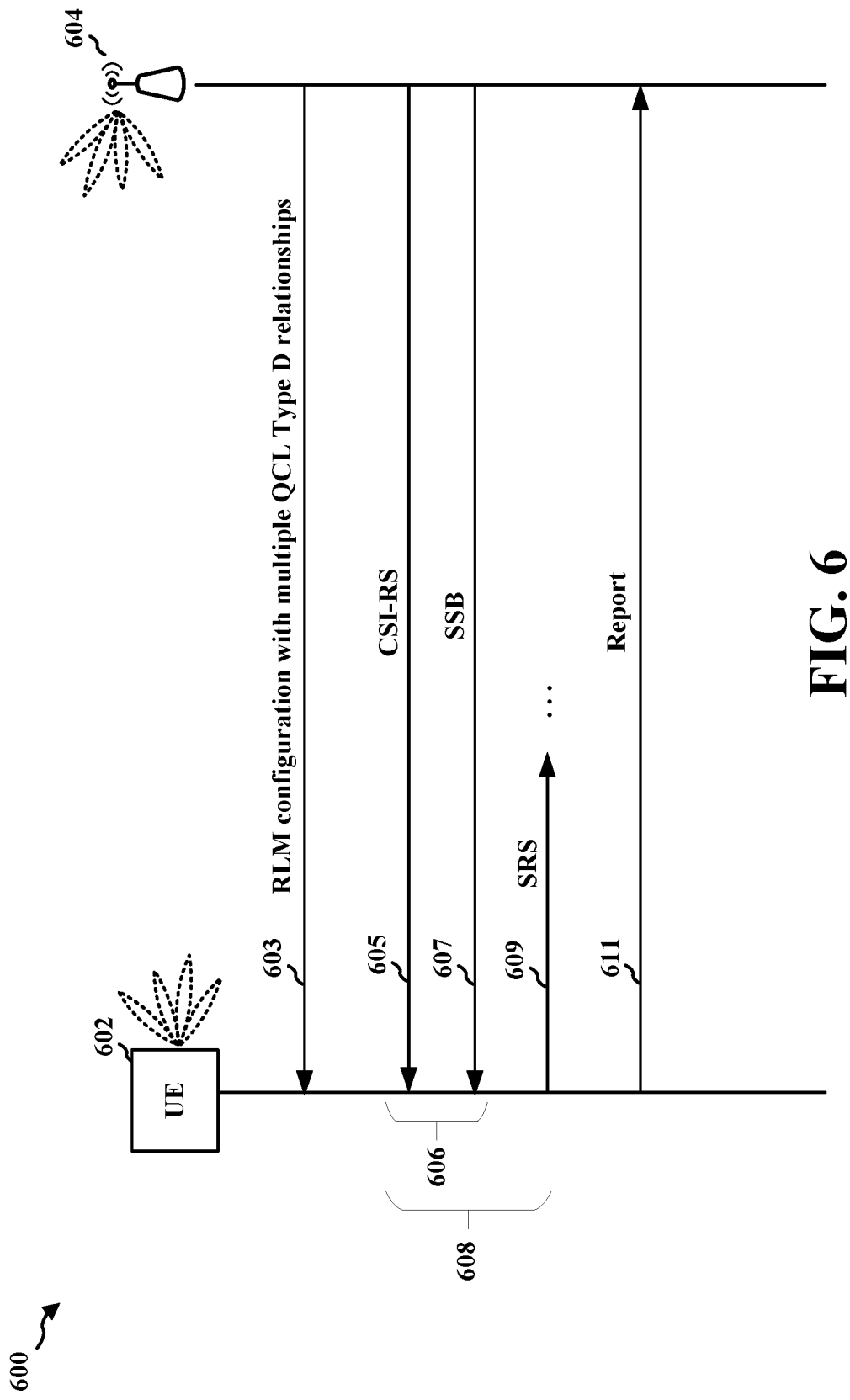
FIG. 6 illustrates an example communication flow between a UE and a base station including a configuration of multiple QCL type D relationships for a single port RLM or BFD RS.

Aspects presented herein provide for SFN radio link monitoring (RLM) and/or beam failure detection (BFD) reference signal (RS) for half-duplex and full-duplex modes. FIG. 6 illustrates an example communication flow 600 between a UE 602 and a base station 604 including the configuration 603 of multiple QCL type D relationships (e.g., TCI state(s)/spatial relation(s)) for a single port RLM/BFD RS. The UE 602 may then use the configuration to perform RLM/BFD in a half-duplex mode or full-duplex mode. For example, as illustrated at 606, the UE may perform RLM/BFD based on downlink reception on the two or more TCI states. As illustrated at 608, the UE may perform RLM/BFD for full-duplex communication based on multi-QCL CSI-RS/SRS port SFN communication.

For example, for a half-duplex mode, a non-zero channel state information reference signal (NZP-CSI-RS) resource configuration in RLM or BFD RS configuration may include multiple TCI states (e.g., two TCI states) and may be provided from the base station 604 to the UE 602 in configuration 603. Each TCI state may be indicated with reference to a particular reference signal. The configuration may support single layer transmissions for half-duplex communication or full-duplex communication. For example, the two TCI states associated with one NZP-CSI-RS as RLM or BFD RS may support a half-duplex downlink transmission on 2 beams (e.g., based on both of the TCI states). The two TCI states/spatial relations may support full-duplex communication, e.g., two TCI states associated with one NZP-CSI-RS as RLM or BFD CMR RS may support a full-duplex downlink transmission on 2 beams (e.g., based on both of the TCI states) and two spatial relations associated with one SRS as RLM or BFD IMR RS may support a full-duplex uplink transmission on 2 beams (e.g., based on both of the spatial relations).

The base station 604 may configure the UE 602 with a radio link monitoring configuration (e.g., the configuration 603) that the UE 602 may use to perform measurements to detect beam and/or cell radio link failures. The base station may provide the configuration, e.g., in radio resource control (RRC) signaling. As part of the configuration, the base station may configure multiple RLM RSs. The RLM RS may be indicated with reference to an SSB index and/or a CSI-RS index (e.g., an NZP-CSI-RS resource ID). The base station 604 may transmit the CSI-RS 605 associated with multiple TCI states configured for a single port RLM RS at the UE 602, transmit the SSB 607 associated with multiple TCI states configured for a single port RLM RS at the UE 602. The base station 604 may configure a purpose for the RLM RS, e.g., for beam failure detection, for radio link failure, etc. Thus, the UE 602 may receive and apply multiple QCL type D RS for a radio link monitoring RS associated with a single port. For example, the UE may perform RLM/BFD, at 606 based on the multiple QCL type D RS associated with the single port RLM/BFD RS.

An NZP-CSI-RS resource may be used to configure NZP-CSI-RS transmitted in a cell where an information element (IE) is included. The UE 602 may be configured, e.g., at 603, to perform RLM/BFD measurements on the NZP-CSI-RS resource. A release and additional of the configuration may be provided to change the configuration between a periodic, semi-persistent or aperiodic configuration for the NZP-CSI-RS resource. In some examples, the change of the configuration between a periodic/semi-persistent/aperiodic NZP-CSI-RS resource may not be supported without a release and addition of an NZP-CSI-RS resource configuration. The NZP-CSI-RS resource may be configured based on multiple TCI states (e.g., a QCL information for a CSI-RS based on a first TCI state ID and QCL information for the same CSI-RS based on a second TCI state ID). The two TCI states may be associated with the same port resource and with a same CSI-RS signal that is transmitted at the same time using different beams (e.g., the beams associated with the two TCI states). In some examples, the UE 602 may use the two TCI states for the NZP-CSI-RS to perform half-duplex reception. The UE 602 may perform RLM/BFD measurements, e.g., at 606, based on the half-duplex reception.

In a full-duplex mode, the UE 602 may perform SINR based detection, e.g., based on an interference measurement resource (IMR) to measure self-interference (e.g., for self-interference measurement (SIM)). The UE 602 may receive a configuration, at 603, of the IMR and/or a channel measurement resource (CMR) from the base station 604. In the full-duplex mode, if an SINR threshold is reached, the UE 602 may be triggered to provide a beam failure instance indication to a MAC layer. The UE may provide information about a beam failure instance maximum count and/or a beam failure detection timer to the MAC layer, e.g., along with the beam failure instance indication. The UE 602 may count each beam failure instance, and the beam failure instance maximum count may provide a threshold number of beam failure instance that indicates a beam failure detection that the UE 602 reports to the base station 604, e.g., at 611. The beam failure instances may be counted, e.g., within a period of time, such as based on the beam failure detection timer. The beam failure instance maximum count and/or a beam failure detection timer may be parameters that are configured for the UE 602 by the base station 604. An uplink reference signal (e.g., an SRS) may be added to the RLM configuration for full-duplex. The UE may transmit an uplink signal based on the configured SRS, at 609, and may measure interference caused by the SRS 609 to downlink reception of the UE 602. For full-duplex RLM, the UE 602 may be configured, at 603, with two categories of reference signals, e.g., a first reference signal for CMR and a second reference signal for IMR. The base station 604 may configure an NZP-CSI-RS resource for CMR and SRS resource for IMR to include two TCI states per NZP-CSI-RS and two spatial relations per SRS. In this example, the RLM RS may include an CMR configured with reference to an SSB index or a CSI-RS index and may also include an IMR configured with reference to an SRS index.

In some examples, an SRS resource for IMR for the UE 602 may be configured for a single SRS port having multiple spatial relations. For example, the base station 604 may configure the UE 602 with first SRS spatial relation information and second SRS spatial relation information for a BFD/RLM IMR RS for full-duplex communication. The SRS spatial relation information may be based on a QCL type D relationship to an SSB index, a CSI-RS index, or an SRS.

The UE 602 may use the configured TCI states/spatial relations for the single port RS for the RLM/BFD to perform radio link monitoring and/or beam failure detection. The RLM/BFD may be performed for half-duplex communication or for full-duplex communication.

For example, the UE 602 may receive half-duplex communication based on multiple TCI states associated with the multiple QCL type D relationships configured for the single port RS for the RLM/BFD based on an SSB or an NZP-CSI-RS. In other examples, the UE may receive full-duplex communication based on multiple TCI states associated with the multiple QCL type D relationships configured for the single port RS for the RLM/BFD based on an SSB or an NZP-CSI-RS and transmit full-duplex communication based on the multiple spatial relations associated with the multiple QCL type D relationships configured for the single port RS for the RLM or BFD based on an SRS.

The UE 602 may transmit a report 611 based on the RLM measurements and/or BFD measurements. The report 611 may be based on the RLM or BFD configuration provided to the UE 602 by the base station 604.

Figure 7:
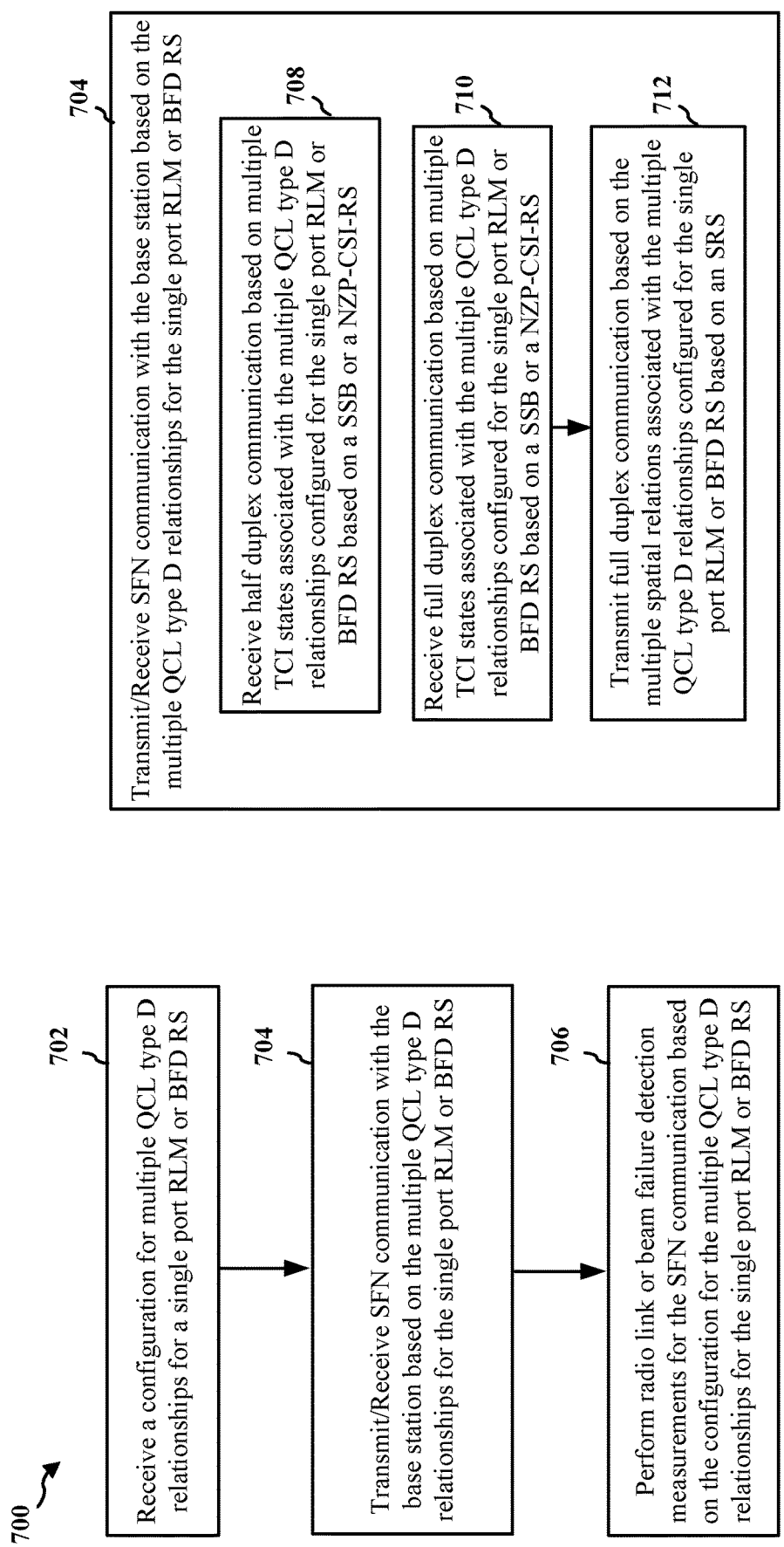
FIGS. 7A and 7B are flowcharts a methods of wireless communication at a UE including receiving and applying a configuration of multiple QCL type D relationships for a single port RLM or BFD RS.

FIG. 7A is a flowchart 700 of a method of wireless communication. The method may be performed by a UE, a component of a UE, or a device implementing UE functionality (e.g., the UE 104, 350, 402*a-c*, 602; the apparatus 802). The method may help improve reliability of SFN communication through RLM and BFD for full-duplex communication based on multiple QCL type D reference signals for a single port for RLM/BFD.

At 702, the UE receives, from a base station, a configuration for multiple QCL type D relationships for a single port RS for RLM or BFD. The reception may be performed, e.g., by the configuration component 840 in the apparatus 802 in FIG. 8. FIG. 6 illustrates an example of UE 602 receiving a configuration from the base station 604. In some examples, the configuration may be for two QCL type D relationships for the single port RS for the RLM or BFD. The multiple QCL type D relationships may include multiple TCI states for the single port RS for the RLM or BFD. The multiple QCL type D relationships may be for the RLM RS or BFD RS based on multiple SSB indexes. The multiple QCL type D relationships may be for the RLM or BFD RS based on multiple CSI-RS indexes. The multiple QCL type D relationships may be for an NZP-CSI-RS resource based on multiple TCI states. The UE may monitor for the NZP-CSI-RS, e.g., at 704, based on the multiple TCI states. The multiple QCL type D relationships may be for RLM reference signals for full-duplex communication including an SRS and at least one of a CSI-RS or an SSB. The SRS may be configured as an IMR and the at least one of the CSI-RS or the SSB may be configured as a CMR. The multiple QCL type D relationships may be for an SRS resource based on multiple spatial relations. Each of the multiple spatial relations may be associated with an SSB index, a CSI-RS index, or an SRS index.

At 704, the UE transmits or receives SFN communication from the base station based on the multiple QCL type D relationships for the single port RLM or BFD RS. The transmission/reception may be performed, e.g., by the SFN component 842 in the apparatus 802 in FIG. 8. FIG. 6 illustrates example aspects of a UE 602 receiving/transmitting based on the configuration 603 from a base station 604.

FIG. 7B illustrates that in some aspects, the transmission/reception of the SFN communication with the UE may include receiving half-duplex communication based on multiple TCI states associated with the multiple QCL type D relationships configured for the single port RLM or BFD RS based on an SSB or an NZP-CSI-RS, e.g., as illustrated at 708. The transmission/reception of the SFN communication with the UE may include receiving full-duplex communication based on multiple TCI states associated with the multiple QCL type D relationships configured for the single port RLM or BFD RS based on a SSB or a NZP-CSI-RS, e.g., as illustrated at 710, and transmitting full-duplex communication based on the multiple spatial relations associated with another multiple QCL type D relationships configured for the single port RLM or BFD RS based on a SRS, e.g., as illustrated at 712. The multiple QCL type D relationships for the single port SRS are different QCL type D relationships for a single port CSI-RS or SSB. The reception of the SFN communication to the UE may further include reception of control information based on a single CORESET ID associated with the multiple TCI states.

At 706, the UE performs radio link or beam failure detection measurements for the SFN communication based on the configuration for the multiple QCL type D relationships for the single port RLM or BFD RS. The RLM may be performed, e.g., by the RLM component 844 of the apparatus 802. The BFD may be performed, e.g., by the BFD component 846 of the apparatus 802. For example, the multiple QCL type D relationships configured at 702 may be for an SRS resource based on multiple spatial relations for self-interference measurements. The UE may perform BFD, e.g., at 706, based on measurement of a reference signal based on the multiple spatial relations. The beam failure detection may comprise full-duplex beam failure detection based on the multiple spatial relations and multiple TCI states.

Figure 8:
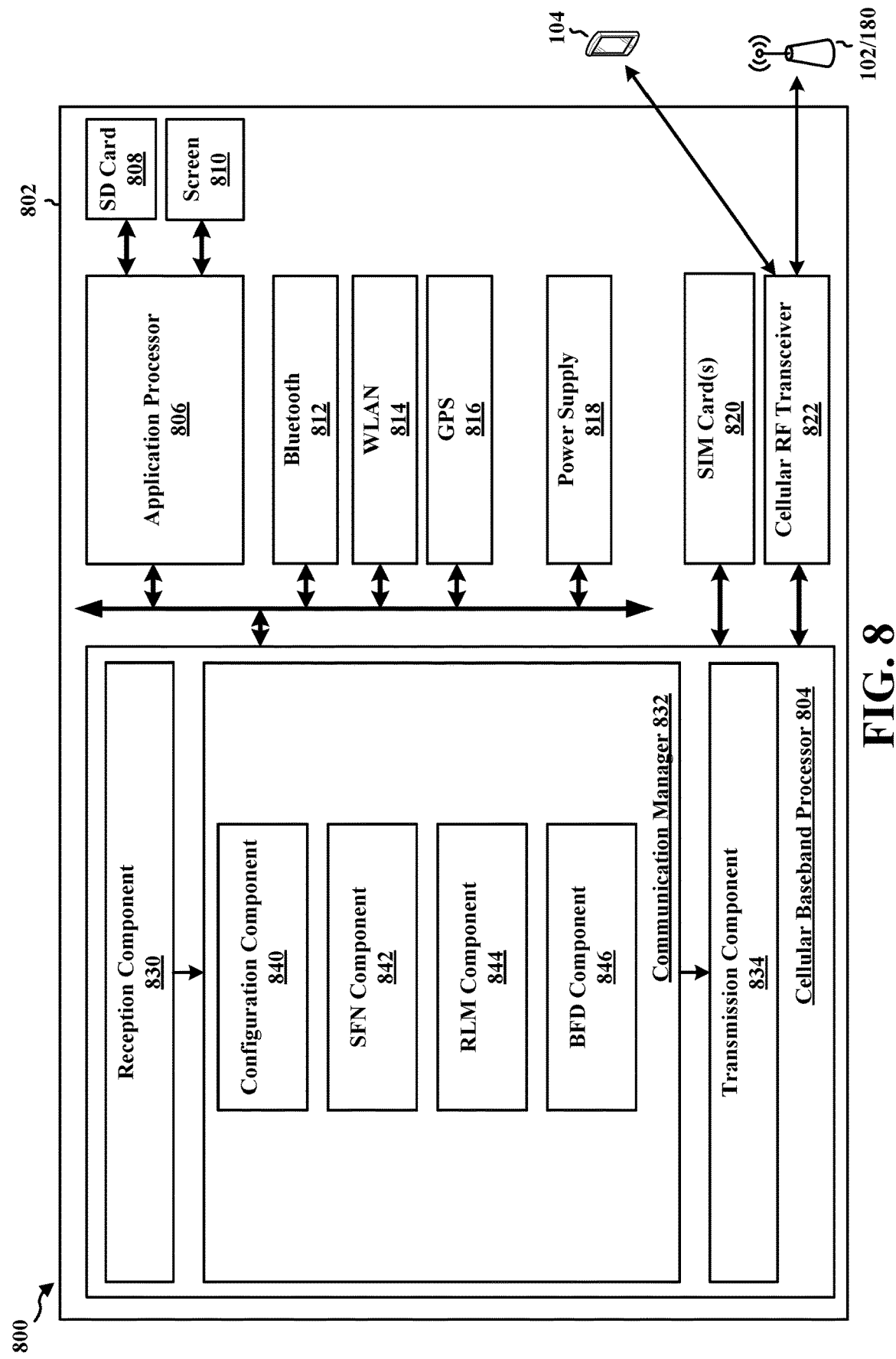
FIG. 8 is a diagram illustrating an example of a hardware implementation for an example apparatus.

FIG. 8 is a diagram 800 illustrating an example of a hardware implementation for an apparatus 802. The apparatus 802 may be a UE, a component of a UE, or may implement UE functionality. In some aspects, the apparatus 802 includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see 350 of FIG. 3) and include the additional modules of the apparatus 802.

The communication manager 832 includes a configuration component 840 that is configured to receive, from a base station, a configuration for multiple QCL type D relationships for a single port RLM or BFD RS, e.g., as described in connection with 702 in FIG. 7A. The communication manager 832 further includes an SFN component 842 that transmits or receives SFN communication from the base station based on the multiple QCL type D relationships for the single port RLM or BFD RS, e.g., as described in connection with 704 in FIG. 7A. The communication manager 832 may further include an RLM component 844 that performs RLM measurements for the SFN communication based on the configuration for the multiple QCL type D relationships for the single port RLM or BFD RS, e.g., as described in connection with 706. The communication manager 832 may further include a BFD component 846 that performs BFD measurements for the SFN communication based on the configuration for the multiple QCL type D relationships for the single port RLM or BFD RS, e.g., as described in connection with 706.

The apparatus may include additional components that perform each of the blocks of the algorithm in the flowcharts of FIGS. 7A, 7B, and/or the aspects performed by the UE in FIG. 6. As such, each block in the flowcharts of FIGS. 7A, 7B, and/or the aspects performed by the UE in FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for receiving, from a base station, a configuration for multiple QCL type D relationships for a single port RLM or BFD RS. The apparatus 802 includes means for transmitting or receiving SFN communication from the base station based on the multiple QCL type D relationships for the single port RLM or BFD RS. The apparatus 802 includes means for performing radio link or beam failure detection measurements for the SFN communication based on the configuration for the multiple QCL type D relationships for the single port RLM or BFD RS. The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
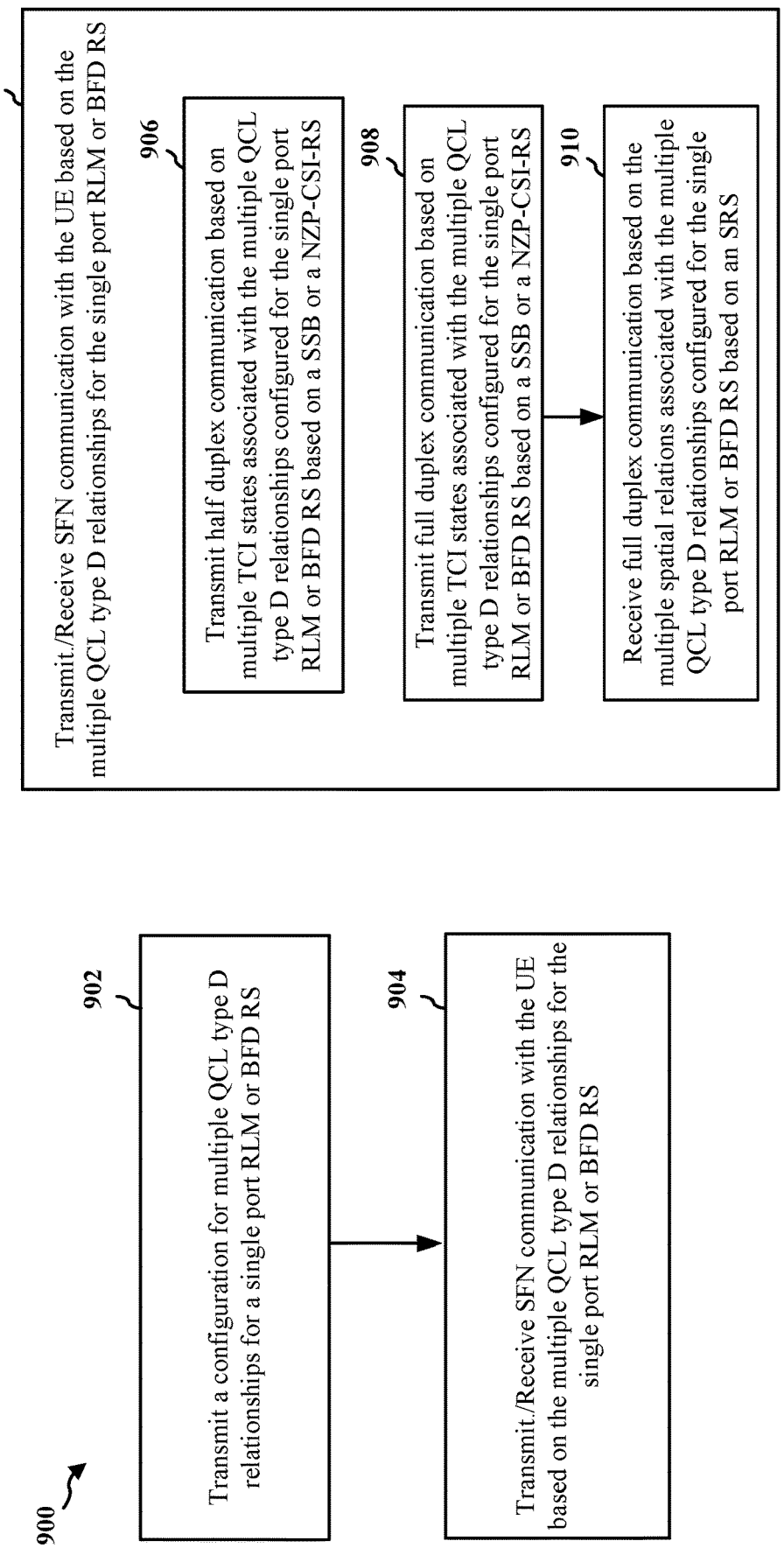
FIGS. 9A and 9B are flowcharts of methods of wireless communication at a base station including providing a configuration of multiple QCL type D relationships for a single port RLM or BFD RS.

FIG. 9A is a flowchart 900 of a method of wireless communication. The method may be performed by a base station (e.g., the base station 102, 180, 310, 402a-c, 604; the apparatus 1002). The method may help improve reliability of SFN communication through RLM and BFD for full-duplex communication based on multiple QCL type D reference signals for a single port for RLM/BFD.

At 902, the base station transmits, to a UE, a configuration for multiple QCL type D relationships for a single port RLM or BFD RS. The transmission may be performed, e.g., by the configuration component 1040 in the apparatus 1002 in FIG. 10. FIG. 6 illustrates an example of a base station 604 providing a configuration 603 to a UE 602. some examples, the configuration may be for two QCL type D relationships for the single port RLM or BFD RS. The multiple QCL type D relationships may include multiple TCI states for the single port for the RLM or BFD RS. The multiple QCL type D relationships may be for the RLM or BFD RS based on multiple SSB indexes. The multiple QCL type D relationships may be for the RLM or BFD RS based on multiple CSI-RS indexes. The multiple QCL type D relationships may be for an NZP-CSI-RS resource based on multiple TCI states. The base station may transmit the NZP-CSI-RS, e.g., at 904, based on the multiple TCI states. The multiple QCL type D relationships may be for RLM reference signals for full-duplex communication including an SRS and at least one of a CSI-RS or an SSB. The SRS may be configured as an IMR and the at least one of the CSI-RS or the SSB may be configured as a CMR. The multiple QCL type D relationships may be for an SRS resource based on multiple spatial relations. Each of the multiple spatial relations may be associated with an SSB index, a CSI-RS index, or an SRS index.

At 904, the base station transmits/receives SFN communication with the UE based on the multiple QCL type D relationships for the single port RLM or BFD RS. The transmission/reception may be performed, e.g., by the SFN component 1042 in the apparatus 1002 in FIG. 10. FIG. 6 illustrates example aspects of a base station receiving/transmitting based on the configuration 603 for a UE 602.

FIG. 9B illustrates that in some aspects, the transmission/reception of the SFN communication with the UE may include transmitting half-duplex communication based on multiple TCI states associated with the multiple QCL type D relationships configured for the single port RLM or BFD RS based on an SSB or an NZP-CSI-RS, e.g., as illustrated at 906. The transmission/reception of the SFN communication with the UE may include transmitting full-duplex communication based on multiple TCI states associated with the multiple QCL type D relationships configured for the single port RLM or BFD RS based on a SSB or a NZP-CSI-RS, e.g., as illustrated at 908, and receiving full-duplex communication based on the multiple spatial relations associated with the multiple QCL type D relationships configured for the single port RLM or BFD RS based on a SRS, e.g., as illustrated at 910. The transmission of the SFN communication to the UE may further include transmitting control information to the UE based on a single CORESET ID associated with the multiple TCI states.

Figure 10:
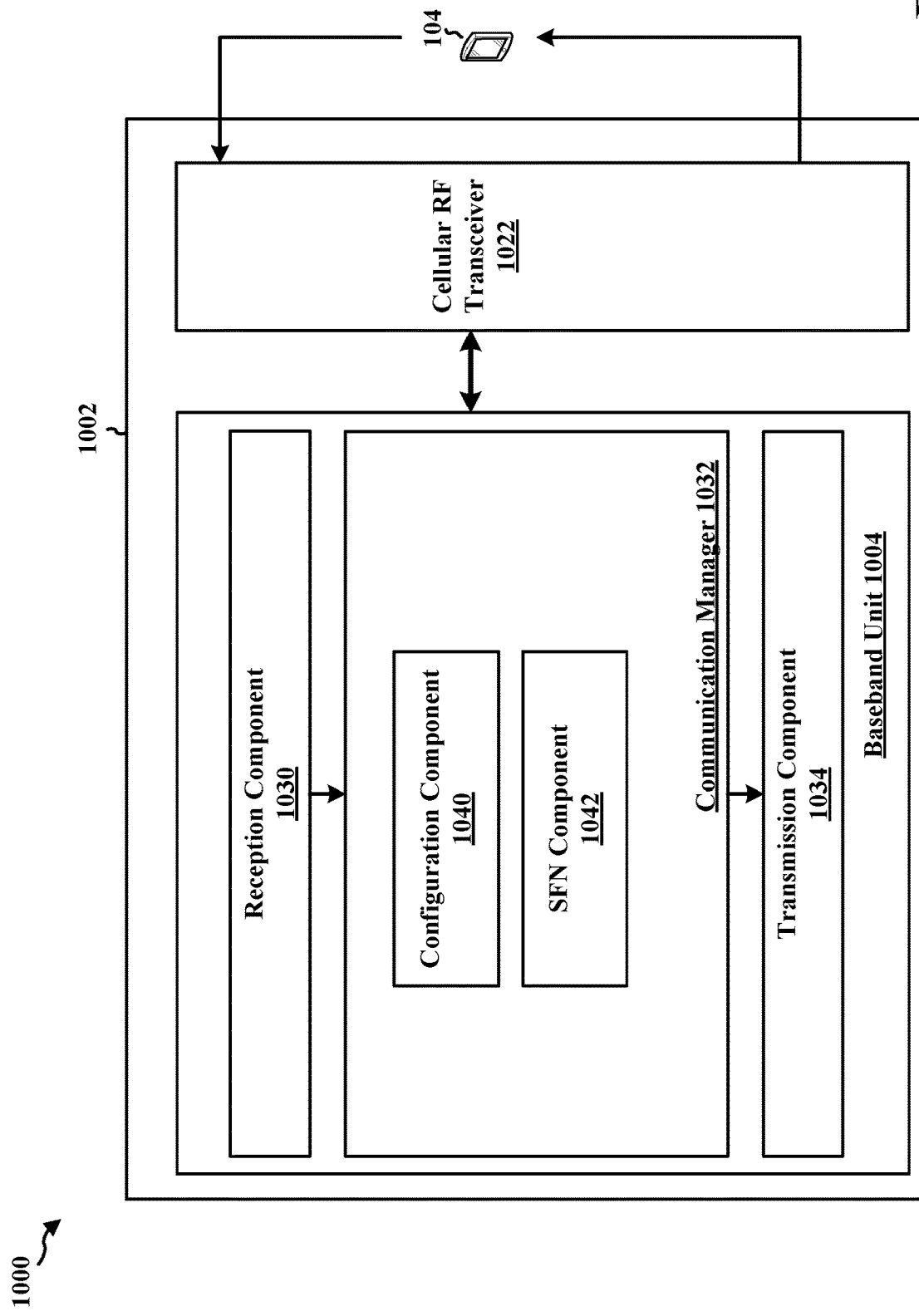
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement base station functionality. In some aspects, the apparatus may include a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a configuration component 1040 that transmits, to a UE, a configuration for multiple QCL type D relationships for a single port RLM or BFD RS, e.g., as described in connection with 902 in FIG. 9A. The communication manager 1032 includes an SFN component 1042 that is configured to transmit or receive SFN communication with the UE based on the multiple QCL type D relationships for the single port RLM or BFD RS, e.g., as described in connection with 904 in FIG. 9A.

The apparatus may include additional components that perform each of the blocks of the algorithm in the flowcharts of FIGS. 9Ab 9B, and/or the aspects performed by the base station in FIG. 6. As such, each block in the flowcharts of FIGS. 9A, 9B, and/or the aspects performed by the base station in FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for transmitting, to a UE, a configuration for multiple QCL type D relationships for a single port RLM or BFD RS. The apparatus 1002 includes means for transmitting or receiving SFN communication with the UE based on the multiple QCL type D relationships for the single port RLM or BFD RS. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving, from a base station, a configuration for multiple QCL type D relationships for a single port RS for RLM or BFD; transmitting or receiving SFN communication from the base station based on the multiple QCL type D relationships for the single port RS for the RLM or the BFD; and performing radio link or beam failure detection measurements for the SFN communication based on the configuration for the multiple QCL type D relationships for the single port RS for the RLM or the BFD.

In aspect 2, the method of aspect 1 further includes that the transmitting or receiving the SFN communication from the base station includes receiving half-duplex communication based on multiple TCI states associated with the multiple QCL type D relationships configured for the single port RS for the RLM or the BFD based on a SSB or an NZP-CSI-RS.

In aspect 3, the method of aspect 1 further include that the transmitting or receiving the SFN communication from the base station includes receiving full-duplex communication based on multiple TCI states associated with the multiple QCL type D relationships configured for the single port RS for the RLM or the BFD based on an SSB or an NZP-CSI-RS; and transmitting the full-duplex communication based on multiple spatial relations associated with the multiple QCL type D relationships configured for the single port RS for the RLM or the BFD based on a SRS.

In aspect 4, the method of any of aspects 1-3 further includes that the multiple QCL type D relationships includes multiple TCI states for a single port for the single port RS for the RLM or the BFD.

In aspect 5, the method of aspect 4 further includes receiving communication from the base station includes monitoring for control information from the base station based on a single CORESET ID associated with the multiple TCI states.

In aspect 6, the method of any of aspects 1-5 further includes that the multiple QCL type D relationships are for the single port RS for the RLM or the BFD based on multiple SSB indexes.

In aspect 7, the method of any of aspects 1-5 further includes that the multiple QCL type D relationships are for the single port RS for the RLM or the BFD based on multiple CSI-RS indexes.

In aspect 8, the method of any of aspects 1-5 further includes that the multiple QCL type D relationships are for a non-zero channel state information reference signal NZP-CSI-RS) resource based on multiple TCI states.

In aspect 9, the method of aspect 8 further includes that the UE monitors for the NZP-CSI-RS based on the multiple TCI states.

In aspect 10, the method of aspect 1 further includes that the multiple QCL type D relationships are for the single port RS for the RLM or the BFD for full-duplex communication including a SRS and at least one of a CSI-RS or an SSB.

In aspect 11, the method of aspect 10 further includes that the SRS is configured as an IMR and the at least one of the CSI-RS or the SSB is configured as a CMR.

In aspect 12, the method of aspect 10 or 11 further includes that multiple QCL type D relationships are for an SRS resource based on multiple spatial relations.

In aspect 13, the method of aspect 12 further includes performing the BFD based on measurement of a reference signal based on the multiple spatial relations.

In aspect 14, the method of aspect 13 further includes that the beam failure detection comprises full-duplex beam failure detection based on the multiple spatial relations.

In aspect 15, the method of any of aspects 12-14 further includes each of the multiple spatial relations are associated with an SSB index, a CSI-RS index, or an SRS index.

In aspect 16, the method of any of aspects 1-15 further includes that the configuration is for two QCL type D relationships for a single port for the single port RS for the RLM or the BFD.

Aspect 17 is an apparatus for wireless communication at a UE, comprising means to perform the method of any of aspects 1-16.

In aspect 18, the apparatus of aspect 17 further includes at least one antenna and a transceiver coupled to the at least one antenna.

Aspect 19 is an apparatus for wireless communication at a UE, comprising: memory; and at least one processor coupled to the memory, the memory and at least one processor being configured to perform the method of any of aspects 1-16.

In aspect 20, the apparatus of aspect 19 further includes at least one antenna and a transceiver coupled to the at least one antenna and the at least one processor.

Aspect 21 is a non-transitory computer-readable medium storing computer executable code for wireless communication at a UE, the code when executed by a processor cause the processor to perform the method of any of aspects 1-16.

Aspect 22 is a method of wireless communication at a base station, comprising: transmitting, to a UE, a configuration for multiple QCL type D relationships for a single port RS for RLM or BFD; and transmitting or receiving SFN communication with the UE based on the multiple QCL type D relationships for the single port RS for the RLM or the BFD.

In aspect 23, the method of aspect 22 further includes that the transmitting or receiving the SFN communication with the UE includes transmitting half-duplex communication based on multiple TCI states associated with the multiple QCL type D relationships configured for the single port RS for the RLM or the BFD based on a SSB or a NZP-CSI-RS.

In aspect 24, the method of aspect 22 further includes that the transmitting or receiving the SFN communication with the UE includes: transmitting full-duplex communication based on multiple TCI states associated with the multiple QCL type D relationships configured for the single port RS for the RLM or the BFD based on an SSB or a NZP-CSI-RS; and receiving the full-duplex communication based on multiple spatial relations associated with the multiple QCL type D relationships configured for the single port RS for the RLM or the BFD based on an SRS.

In aspect 25, the method of aspect 22 further includes that the multiple QCL type D relationships include multiple TCI states for a single port for the single port RS for the RLM or the BFD, and wherein transmitting the SFN communication to the UE includes transmitting control information to the UE based on a single CORESET ID associated with the multiple TCI states.

In aspect 26, the method of any of aspects 22-25 further includes that the multiple QCL type D relationships are for the RS for the RLM or the BFD based on multiple SSB indexes.

In aspect 27, the method of any of aspects 22-25 further includes that the multiple QCL type D relationships are for the RS for the RLM or the BFD based on multiple CSI-RS indexes.

In aspect 28, the method of any of aspects 22-25 further includes that the multiple QCL type D relationships are for a NZP-CSI-RS resource based on multiple TCI states.

In aspect 29, the method of aspect 28 further includes that the base station transmits the NZP-CSI-RS based on the multiple TCI states.

In aspect 30, the method of any of aspects 22-25 further includes that the multiple QCL type D relationships are for RLM reference signals for full-duplex communication including an SRS and at least one of a CSI-RS or an SSB.

In aspect 31, the method of aspect 30 further includes that the SRS is configured as an IMR and the at least one of the CSI-RS or the SSB is configured as a CMR.

In aspect 32, the method of any of aspect 30 further includes that the multiple QCL type D relationships are for RLM reference signals for full-duplex communication including a SRS and at least one of a CSI-RS or an SSB, and wherein multiple QCL type D relationships are for an SRS resource based on multiple spatial relations.

In aspect 33, the method of aspect 32 further includes that each of the multiple spatial relations are associated with an SSB index, a CSI-RS index, or an SRS index.

In aspect 34, the method of any of aspects 22-33 further includes that the configuration is for two QCL type D relationships for the single port RS for the RLM or the BFD.

Aspect 35 is an apparatus for wireless communication at a base station, comprising means to perform the method of any of aspects 22-34.

In aspect 36, the apparatus of aspect 35 further includes at least one antenna and a transceiver coupled to the at least one antenna.

Aspect 37 is an apparatus for wireless communication at a base station, comprising: memory; and at least one processor coupled to the memory, the memory and at least one processor being configured to perform the method of any of aspects 22-34.

In aspect 38, the apparatus of aspect 37 further includes at least one antenna and a transceiver coupled to the at least one antenna and the at least one processor.

Aspect 39 is a non-transitory computer-readable medium storing computer executable code for wireless communication at a base station, the code when executed by a processor cause the processor to perform the method of any of aspects 22-34.

What is claimed is:

1. An apparatus for wireless communication at a user equipment (UE), comprising:
   memory; and
   at least one processor coupled to the memory and configured to cause the UE to:
      receive, from a base station, a configuration for multiple quasi co-location (QCL) type D relationships for a single port reference signal (RS) for radio link management (RLM) or beam failure detection (BFD);
      transmit or receive single frequency network (SFN) communication with the base station based on the multiple QCL type D relationships for the single port RS for the RLM or the BFD, including:
         receive half-duplex communication based on multiple transmission configuration indicator (TCI) states associated with the multiple QCL type D relationships configured for the single port RS for the RLM or the BFD based on a synchronization signal block (SSB) or a non-zero power channel state information reference signal (NZP-CSI-RS), or
         receive full-duplex communication based on the multiple TCI states associated with the multiple QCL type D relationships configured for the single port RS for the RLM or the BFD based on the SSB or the NZP-CSI-RS, and
         transmit the full-duplex communication based on multiple spatial relations associated with the multiple QCL type D relationships configured for the single port RS for the RLM or the BFD based on a sounding reference signal (SRS); and
      perform radio link or beam failure detection measurements for the SFN communication based on the configuration for the multiple QCL type D relationships for the single port RS for the RLM or the BFD.

2. The apparatus of claim 1, wherein to transmit or receive the SFN communication with the base station, the at least one processor is configured to cause the UE to receive the half-duplex communication based on the multiple TCI states associated with the multiple QCL type D relationships configured for the single port RS for the RLM or the BFD based on the SSB or the NZP-CSI-RS.

3. The apparatus of claim 1, wherein to transmit or receive the SFN communication with the base station, the at least one processor is configured to cause the UE to:
   receive the full-duplex communication based on the multiple TCI states associated with the multiple QCL type D relationships configured for the single port RS for the RLM or the BFD based on the SSB or the NZP-CSI-RS; and
   transmit the full-duplex communication based on the multiple spatial relations associated with the multiple QCL type D relationships configured for the single port RS for the RLM or the BFD based on the SRS.

4. The apparatus of claim 1, wherein the multiple QCL type D relationships include the multiple TCI states for the single port RS for the RLM or the BFD.

5. The apparatus of claim 4, wherein to receive communication from the base station, the at least one processor is configured to monitor for control information from the base station based on a single control resource set identifier (CORESET ID) associated with the multiple TCI states.

6. The apparatus of claim 1, wherein the multiple QCL type D relationships are for the single port RS for the RLM or the BFD based on multiple SSB indexes.

7. The apparatus of claim 1, wherein the multiple QCL type D relationships are for the single port RS for the RLM or the BFD based on multiple channel state information reference signal (CSI-RS) indexes.

8. The apparatus of claim 1, wherein the multiple QCL type D relationships are for an NZP-CSI-RS resource based on the multiple TCI states.

9. The apparatus of claim 8, wherein the at least one processor is further configured to:
   monitor for the NZP-CSI-RS based on the multiple TCI states.

10. An apparatus for wireless communication at a user equipment (UE), comprising:
    memory; and
    at least one processor coupled to the memory and configured to cause the UE to:
       receive, from a base station, a configuration for multiple quasi co-location (QCL) type D relationships for a single port reference signal (RS) for radio link management (RLM) or beam failure detection (BFD), wherein the multiple QCL type D relationships are for the single port RS for the RLM or the BFD for full-duplex communication including a sounding reference signal (SRS) and at least one of a channel state information reference signal (CSI-RS) or a synchronization signal block (SSB);

transmit or receive single frequency network (SFN) communication with the base station based on the multiple QCL type D relationships for the single port RS for the RLM or the BFD; and perform radio link or beam failure detection measurements for the SFN communication based on the configuration for the multiple QCL type D relationships for the single port RS for the RLM or the BFD.

11. The apparatus of claim 10, wherein the SRS is configured as an interference measurement resource (IMR) and the at least one of the CSI-RS or the SSB is configured as a channel measurement resource (CMR).

12. The apparatus of claim 10, wherein the multiple QCL type D relationships are for an SRS resource based on multiple spatial relations.

13. The apparatus of claim 12, wherein the at least one processor is further configured to:
perform the BFD based on measurement of a reference signal based on the multiple spatial relations.

14. The apparatus of claim 13, wherein the BFD comprises full-duplex beam failure detection based on the multiple spatial relations.

15. The apparatus of claim 12, wherein each of the multiple spatial relations are associated with an SSB index, a CSI-RS index, or an SRS index.

16. The apparatus of claim 1, wherein the configuration is for two QCL type D relationships for the single port RS for the RLM or the BFD.

17. The apparatus of claim 1, further comprising:
at least one antenna; and
a transceiver coupled to the at least one antenna and the at least one processor.

18. A method of wireless communication at a user equipment (UE), comprising:
receiving, from a base station, a configuration for multiple quasi co-location (QCL) type D relationships for a single port reference signal (RS) for radio link management (RLM) or beam failure detection (BFD);
transmitting or receiving single frequency network (SFN) communication with the base station based on the multiple QCL type D relationships for the single port RS for the RLM or the BFD, including:
receiving half-duplex communication based on multiple transmission configuration indicator (TCI) states associated with the multiple QCL type D relationships configured for the single port RS for the RLM or the BFD based on a synchronization signal block (SSB) or a non-zero power channel state information reference signal (NZP-CSI-RS), or
receiving full-duplex communication based on the multiple TCI states associated with the multiple QCL type D relationships configured for the single port RS for the RLM or the BFD based on the SSB or the NZP-CSI-RS, and
transmitting the full-duplex communication based on multiple spatial relations associated with the multiple QCL type D relationships configured for the single port RS for the RLM or the BFD based on a sounding reference signal (SRS); and
performing radio link or beam failure detection measurements for the SFN communication based on the configuration for the multiple QCL type D relationships for the single port RS for the RLM or the BFD.

19. An apparatus for wireless communication at a base station, comprising:
memory; and
at least one processor coupled to the memory and configured to cause the base station to:
transmit, to a user equipment (UE), a configuration for multiple quasi co-location (QCL) type D relationships for a single port reference signal (RS) for radio link management (RLM) or beam failure detection (BFD); and
transmit or receive single frequency network (SFN) communication with the UE based on the multiple QCL type D relationships for the single port RS for the RLM or the BFD, including:
transmit half-duplex communication based on multiple transmission configuration indicator (TCI) states associated with the multiple QCL type D relationships configured for the single port RS for the RLM or the BFD based on a synchronization signal block (SSB) or a non-zero power channel state information reference signal (NZP-CSI-RS), or
transmit full-duplex communication based on the multiple TCI states associated with the multiple QCL type D relationships configured for the single port RS for the RLM or the BFD based on the SSB or the NZP-CSI-RS, and
receive the full-duplex communication based on multiple spatial relations associated with the multiple QCL type D relationships configured for the single port RS for the RLM or the BFD based on a sounding reference signal (SRS).

20. The apparatus of claim 19, wherein to transmit or receive the SFN communication with the UE, the at least one processor is configured to cause the base station to transmit the half-duplex communication based on the multiple TCI states associated with the multiple QCL type D relationships configured for the single port RS for the RLM or the BFD based on the SSB or the NZP-CSI-RS.

21. The apparatus of claim 19, wherein to transmit or receive the SFN communication with the UE, the at least one processor is configured to cause the base station to:
transmit the full-duplex communication based on the multiple TCI states associated with the multiple QCL type D relationships configured for the single port RS for the RLM or the BFD based on the SSB or the NZP-CSI-RS; and
receive the full-duplex communication based on the multiple spatial relations associated with the multiple QCL type D relationships configured for the single port RS for the RLM or the BFD based on the SRS.

22. The apparatus of claim 19, wherein the multiple QCL type D relationships include the multiple TCI states for the single port RS for the RLM or the BFD, and wherein to transmit the SFN communication to the UE, the at least one processor is configured to transmit control information to the UE based on a single control resource set identifier (CORESET ID) associated with the multiple TCI states.

23. The apparatus of claim 19, wherein the multiple QCL type D relationships are for the RS for the RLM or the BFD based on multiple synchronization signal block (SSB) indexes.

24. The apparatus of claim 19, wherein the multiple QCL type D relationships are for the RS for the RLM or the BFD based on multiple channel state information reference signal (CSI-RS) indexes.

25. The apparatus of claim 19, wherein the multiple QCL type D relationships are for an NZP-CSI-RS resource based on the multiple TCI states, and wherein the at least one processor is configured to transmit the NZP-CSI-RS based on the multiple TCI states.

26. An apparatus for wireless communication at a base station, comprising:
memory; and
at least one processor coupled to the memory and configured to cause the base station to:
transmit, to a user equipment (UE), a configuration for multiple quasi co-location (QCL) type D relationships for a single port reference signal (RS) for radio link management (RLM) or beam failure detection (BFD); and
transmit or receive single frequency network (SFN) communication with the UE based on the multiple QCL type D relationships for the single port RS for the RLM or the BFD, wherein the multiple QCL type D relationships are for RLM reference signals for full-duplex communication including a sounding reference signal (SRS) and at least one of a channel state information reference signal (CSI-RS) or an synchronization signal block (SSB).

27. The apparatus of claim 26, wherein the multiple QCL type D relationships are for an SRS resource based on multiple spatial relations, wherein each of the multiple spatial relations are associated with an SSB index, a CSI-RS index, or an SRS index.

28. The apparatus of claim 26, wherein the configuration is for two QCL type D relationships for the single port RS for the RLM or the BFD.

29. The apparatus of claim 19, further comprising:
at least one antenna; and
a transceiver coupled to the at least one antenna and the at least one processor.

30. A method of wireless communication at a base station, comprising:
transmitting, to a user equipment (UE), a configuration for multiple quasi co-location (QCL) type D relationships for a single port reference signal (RS) for radio link management (RLM) or beam failure detection (BFD); and
transmitting or receiving single frequency network (SFN) communication with the UE based on the multiple QCL type D relationships for the single port RS for the RLM or the BFD, including:
transmitting half-duplex communication based on multiple transmission configuration indicator (TCI) states associated with the multiple QCL type D relationships configured for the single port RS for the RLM or the BFD based on a synchronization signal block (SSB) or a non-zero power channel state information reference signal (NZP-CSI-RS), or
transmitting full-duplex communication based on the multiple TCI states associated with the multiple QCL type D relationships configured for the single port RS for the RLM or the BFD based on the SSB or the NZP-CSI-RS, and
receiving the full-duplex communication based on multiple spatial relations associated with the multiple QCL type D relationships configured for the single port RS for the RLM or the BFD based on a sounding reference signal (SRS).

31. A method of wireless communication at a user equipment (UE), comprising:
receiving, from a base station, a configuration for multiple quasi co-location (QCL) type D relationships for a single port reference signal (RS) for radio link management (RLM) or beam failure detection (BFD), wherein the multiple QCL type D relationships are for the single port RS for the RLM or the BFD for full-duplex communication including a sounding reference signal (SRS) and at least one of a channel state information reference signal (CSI-RS) or a synchronization signal block (SSB);
transmitting or receiving single frequency network (SFN) communication with the base station based on the multiple QCL type D relationships for the single port RS for the RLM or the BFD; and
performing radio link or beam failure detection measurements for the SFN communication based on the configuration for the multiple QCL type D relationships for the single port RS for the RLM or the BFD.

32. The apparatus of claim 26, wherein the SRS is configured as an interference measurement resource (IMR) and the at least one of the CSI-RS or the SSB is configured as a channel measurement resource (CMR).

33. A method of wireless communication at a base station, comprising:
transmitting, to a user equipment (UE), a configuration for multiple quasi co-location (QCL) type D relationships for a single port reference signal (RS) for radio link management (RLM) or beam failure detection (BFD); and
transmitting or receiving single frequency network (SFN) communication with the UE based on the multiple QCL type D relationships for the single port RS for the RLM or the BFD, wherein the multiple QCL type D relationships are for RLM reference signals for full-duplex communication including a sounding reference signal (SRS) and at least one of a channel state information reference signal (CSI-RS) or an synchronization signal block (SSB).

* * * * *